(12) United States Patent
Kashiwagi

(10) Patent No.: US 7,830,448 B2
(45) Date of Patent: Nov. 9, 2010

(54) IMAGING APPARATUS WITH PROTECTING CIRCUIT FOR CCD

(75) Inventor: Motoyuki Kashiwagi, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 401 days.

(21) Appl. No.: 11/953,982

(22) Filed: Dec. 11, 2007

(65) Prior Publication Data

US 2008/0143869 A1 Jun. 19, 2008

(30) Foreign Application Priority Data

Dec. 13, 2006 (JP) ............................. 2006-335496

(51) Int. Cl.
*H04N 5/225* (2006.01)
*G03B 7/26* (2006.01)
(52) U.S. Cl. ...................... 348/372; 396/301
(58) Field of Classification Search ................ 348/372; 396/301, 302
See application file for complete search history.

(56) References Cited

U.S. PATENT DOCUMENTS 5,095,226 A * 3/1992 Tani ........................... 327/540
5,341,220 A * 8/1994 Juen ........................... 348/296
5,469,484 A * 11/1995 Sato et al. .................... 377/58
5,777,508 A    7/1998 Sawanobori
6,856,352 B1 * 2/2005 Kijima ........................ 348/312
7,046,293 B1 * 5/2006 Nagase ....................... 348/372

FOREIGN PATENT DOCUMENTS

JP    2007282368 A  * 10/2007

* cited by examiner

*Primary Examiner*—John M Villecco
(74) *Attorney, Agent, or Firm*—Holtz, Holtz, Goodman & Chick, PC

(57) ABSTRACT

An imaging apparatus is provided with a power source, a power supply circuit connected to the power source and having power supply lines for supplying a positive voltage and a negative voltage, an image pickup element, plural drivers for generating multi-phase driving signals and applying the generated multi-phase driving signals to the image pickup element, a discharging circuit connected in parallel with the plural drivers, and a conducting circuit for allowing unnecessary charge accumulated in the power source to discharge through the power supply circuit for a negative voltage to the discharging circuit at the time when the power source is turned off, wherein the power supply circuit for a negative voltage is connected to the plural drivers.

3 Claims, 5 Drawing Sheets

IMAGING APPARATUS WITH PROTECTING CIRCUIT FOR CCD

CROSS-REFERENCE TO RELATED APPLICATIONS

This application is based on Japanese Patent Application No. 2006-335496 filed on Dec. 13, 2006, and including specification, claims, drawings and summary, the entire contents of which are incorporated herein by reference.

BACKGROUND OF THE INVENTION

1. Field of the Invention

The present invention relates to an imaging apparatus and more particularly to a technique that protects an image pickup element from being damaged and deteriorated due to a negative voltage at the time when power source is turned off.

2. Description of the Related Art

In conventional imaging apparatuses such as digital cameras, Charge Coupled Device (CCD) is widely used as an Image pickup element. CCD is driven by horizontal and vertical transfer driving signals, i.e. a horizontal transfer clock signal and vertical transfer clock signal, wherein the horizontal and vertical transfer driving signals are supplied to CCD in accordance with a timing signal generated by a timing generator (TG).

The horizontal transfer clock signal is a two-phase driving signal to be applied to CCD from a horizontal driver. The vertical transfer clock signal is a multi-phase driving signal (for example, four-phase driving signal) to be applied to CCD from a vertical driver. The vertical transfer clock signal comprises three clock signals having a positive level, a negative level and an intermediate level, respectively, wherein these levels are +15 V, −7 V and 0 V. In short, while the imaging apparatus is in a recording mode, a high positive voltage and a high negative voltage are applied to CCD.

In the imaging apparatus described above, when the power source is turned off, thereby making a power source circuit cease supplying electric power to CCD, a forward bias is applied to a substrate of CCD, allowing current flow through CCD in a forward direction whereby CCD is damaged or deteriorated. Therefore, when the power source is turned off, it is necessary to rapidly make a negative potential in the power supply circuit go down to the ground level. But this process needs much time.

To solve the above disadvantage, there has been proposed a technique, in which a discharging circuit is separately proved, that connects a power line for applying a negative voltage to CCD to the ground according to need, and the power line is grounded in conjunction with operation for ceasing power supply from the power supply circuit to various parts in the imaging apparatus.

However, in the arrangement where the discharging circuit is proved between the power line for applying a negative voltage to CCD and the ground, it is necessary to secure a space on the substrate for installing parts for constructing the discharging circuit. Therefore, such arrangement involves problems that prevent the imaging apparatus from being made small in size.

The present invention has been made to solve problems involved in conventional apparatuses, and has an object to provide an imaging apparatus which can be made compact in size and protects the image pickup element from damage and deterioration due to a negative power voltage.

SUMMARY OF THE INVENTION

According to one aspect of the present invention, there is provided an imaging apparatus which is provided with a power source, a power supply circuit connected to the power source and having power supply lines for supplying a positive voltage and a negative voltage, an image pickup element, plural drivers for generating multi-phase driving signals and applying the generated multi-phase driving signals to the image pickup element, a discharging circuit connected in parallel with the plural drivers, and a conducting circuit for allowing unnecessary charge accumulated in the power source to discharge through the power supply circuit for a negative voltage to the discharging circuit at the time when the power source is turned off, wherein the power supply circuit for a negative voltage is connected to the plural drivers.

According to the present invention, a size of an imaging apparatus can be made compact and the image pickup element is protected from damage and deterioration caused by a negative power voltage.

DETAILED DESCRIPTION OF THE PREFERRED EMBODIMENTS

Figure 1:
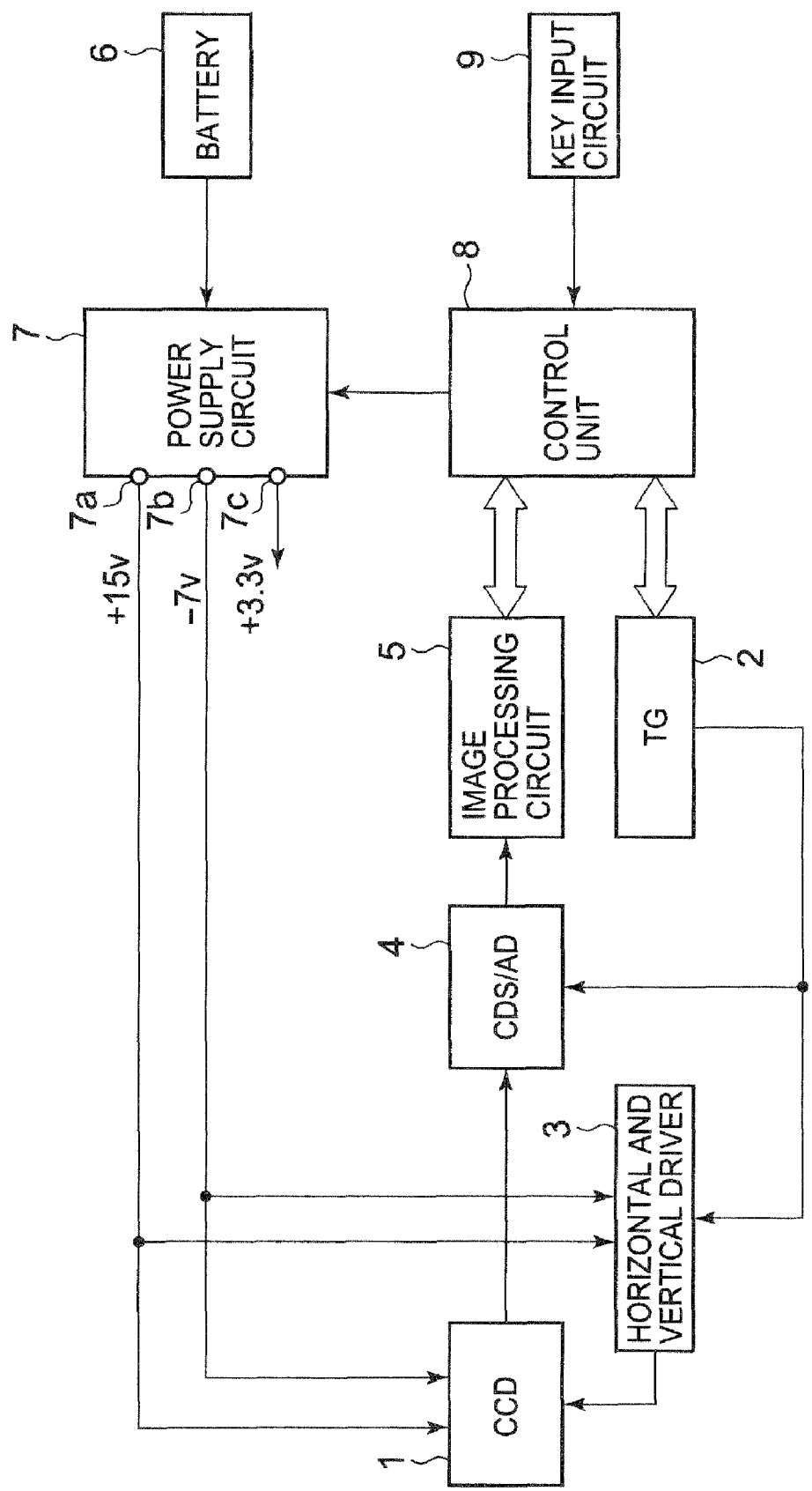
FIG. 1 is a block diagram showing a schematic configuration of an imaging apparatus (digital camera).

FIG. 1 is a block diagram mainly showing a schematic configuration of an imaging system and a power supplying system in a digital camera, wherein the digital camera includes a drive voltage controlling device according to embodiments of the present invention.

The digital camera according to the embodiment of the invention has a typical basic configuration, and is provided with an image pickup element such as CCD 1 of a four-phase driving type. CCD 1 is driven by driving signals for horizontally and vertically transfer whereby an optical image of an object focused thereon through an optical system (not shown) is converted into an electric signal (imaging signal), wherein the driving signals are generated and supplied to CCD 1 by a horizontal and vertical driver 3 based on a timing signal generated by a timing generator (TG) 2.

A signal output from CCD 1 is supplied to CDS/AD circuit 4, where the signal is subjected to a noise reduction process by Correlated Double Sampling (CDS) and converted into a digital signal. Then, the digital signal is subjected to various signal processes executed in an image processing circuit 5, thereby converted into image data. The image data is displayed as a monitor image on a displaying apparatus (not shown), and/or compressed into data in a predetermined format to be recorded on a recording medium such as a memory card.

The digital camera is provided with a power supply circuit 7 including a step-up voltage converter. The power supply circuit 7 uses a battery 6 built-in a camera body as a power source to generate voltages of +15 V, −7 V and +3.3 V for driving various parts of the digital camera. The power supply circuit 7 has an output terminal 7a for a voltage of +15 V and an output terminal 7b for a voltage of −7 V, both of which are connected to CCD 1 and the horizontal and vertical driver 3. Further, the power supply circuit 7 has an output terminal 7c for a voltage of +3.3 V, which is connected to CDS/AD circuit 4 and other circuits in the digital camera.

A control unit 8 controls operation of various parts of the digital camera, and is connected with a key input unit 9. The key input unit 9 comprises various sorts of keys to be manipulated by a user to operate the digital camera, such as a power source key, shutter key, and mode setting keys for setting recording and reproducing modes. Operated states of these keys are successively detected by the control unit 8.

The control unit 8 comprises CPU and peripheral circuits of CPU, ROM and RAM. The control unit 8 operates in accordance with various sorts of control programs recorded on ROM and based on the operated states of the keys in the input key unit 9. Further, the control unit 8 controls a signal generating operation of TG 2 to make the same generate a timing signal, as will be described herein after.

Figure 2:
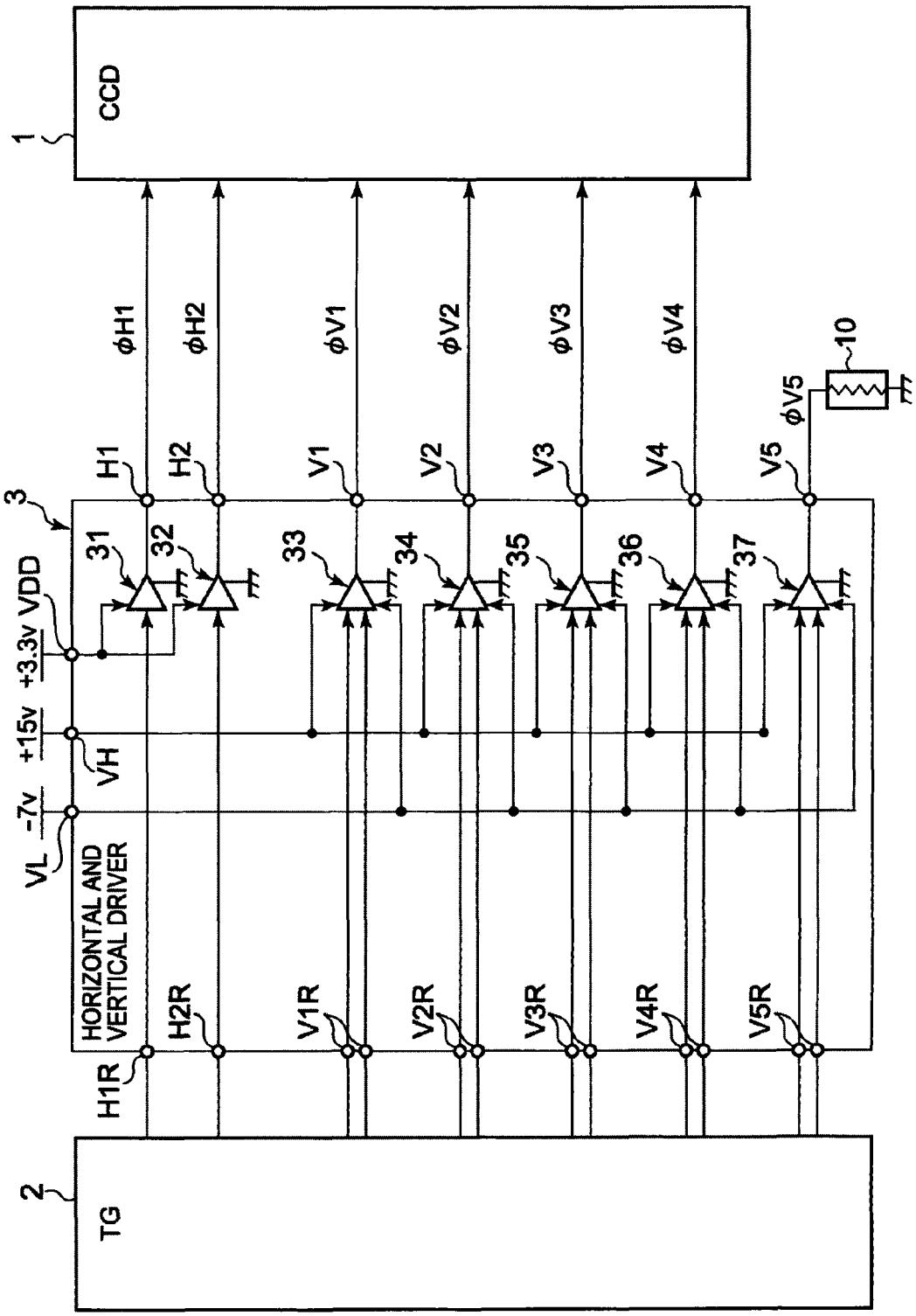
FIG. 2 is a view illustrating an internal structure of a horizontal and vertical driver in the imaging apparatus.

FIG. 2 is a view illustrating an internal structure of the horizontal and vertical driver 3. The horizontal and vertical driver 3 is a device designed for driving two types of CCD, such as a four-phase driving CCD and a five-phase driving CCD. The horizontal and vertical driver 3 comprises horizontal drivers 31, 32 and vertical drivers 33 to 37, which are packaged within a single and the same module.

The horizontal drivers 31, 32 are connected to the power supply circuit 7 through a power input terminal VDD for a voltage of +3.3 V. Further, the horizontal drivers 31, 32 are connected to TG 2 through input terminals H1R, H2R for horizontal transfer timing signals, respectively, and also connected to horizontal transfer electrodes (not shown) of CCD 1 through output terminals H1, H2 for horizontal transfer clock signals, respectively.

The vertical drivers 33 to 37 are connected to the power supply circuit 7 through a power input terminal VH for a voltage of +15 V and a power input terminal VL for a voltage of −7 V. Further, the vertical drivers 33 to 37 are connected to TG 2 through input terminals V1R, V2R, V3R, V4R and V5R for vertical transfer timing signals, respectively, and only vertical drivers 33 to 36 are connected to vertical transfer electrodes (not shown) of CCD 1 through output, terminals V1, V2, V3 and V4 for vertical transfer clock signals, respectively.

The horizontal drivers 31, 32 and the vertical drivers 33 to 36 change voltages to be applied to CCD 1 at timings corresponding to predetermined horizontal and vertical timing signals sent from TG 2, thereby generating two-phase horizontal transfer clock signals $\phi H1$, $\phi H2$ and four-phase vertical transfer clock signals $\phi V1$, $\phi V2$, $\phi V3$, $\phi V4$, respectively to drive CCD 1, wherein the horizontal and vertical timing signals sent from TG 2 are held in synchronization with each other.

An output terminal V5 of the vertical driver 37 for a vertical transfer clock signal is connected to one end of a resistor 10 whose other end is grounded.

When the power source of the digital camera is turned off, the vertical driver 37 operates in accordance with a predetermined control signal other than the horizontal and vertical timing signals sent from TG 2, thereby allowing unnecessary charge accumulated in the power supply circuit 7 to discharge from the power input terminal VL for a voltage of −7 V to the ground through the resistor 10.

The TG 2 has an active mode for driving CCD 1 and a standby mode for ceasing driving CCD 1. TG 2 is set to the active mode while the digital camera is operating in the recording mode, and set to the standby mode for a predetermined period immediately after the recording mode is switched to the reproducing mode. The mode setting operation of TG 2 is performed in accordance with a setting value of a control register (not shown) provided within TG 2, wherein the setting value of the control register is re-written as needed by the control unit 8.

Onto the control register are written setting values by the control unit 8, when the digital camera starts operation, wherein the setting values determine depending on each operation mode contents of the output clock signals (timing signals, control signals) to be supplied to the drivers 31, 32, and 33 to 37. More specifically, in the active mode, onto the control register are written setting values for periodically changing output voltages of the vertical drivers 33 to 36 (generation of vertical transfer clock signals $\phi V1$, $\phi V2$, $\phi V3$, $\phi V4$), and a setting value for fixing an output voltage of the vertical driver 37 to a voltage of 0 V. Further, in the standby mode, onto the control register are written setting values for fixing the output voltage of the vertical drivers 33 to 36 to a voltage of 0 V, and a setting value for fixing the output voltage of the vertical driver 37 to a voltage of −7 V.

Figure 3:
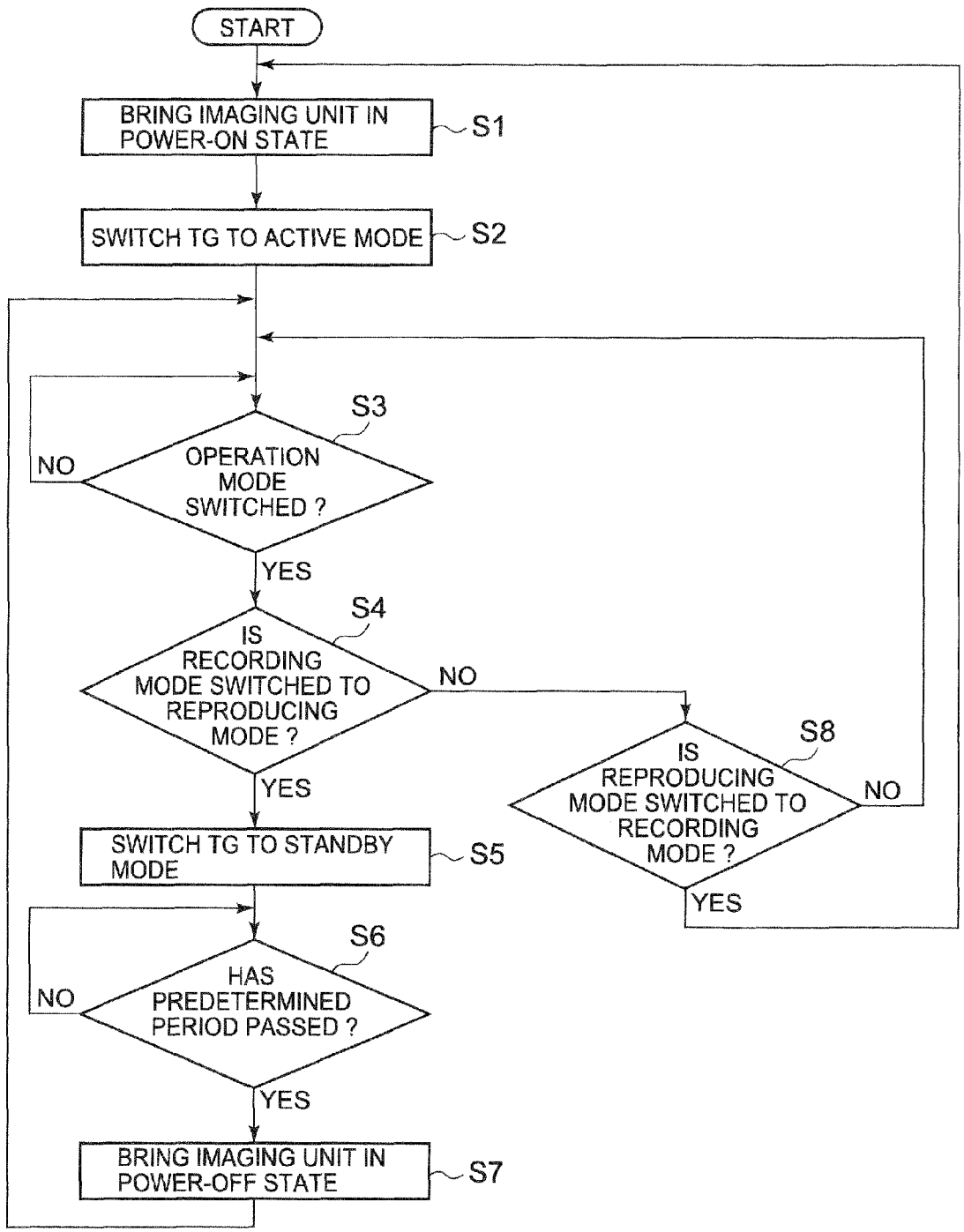
FIG. 3 is a flow chart of processes to be executed by a control unit 8 to control operation of TG 2.

FIG. 3 is a flow chart of processes to be executed by the control unit: 8 to control operation of TG 2. It is assumed in the flow chart that the digital camera immediately starts operation in the recording mode when the power source is turned on.

When the power source of an imaging apparatus is turned on, the control unit 8 makes the power supply circuit 7 supply electric power to an imaging unit including CCD 1, TG 2, the horizontal and vertical driver 3 and CDS/AD 4, bringing the imaging unit in power-on state at step S1. Further, the control unit 8 brings TG 2 in the active mode, driving CCD 1 at step S2.

Figure 4:
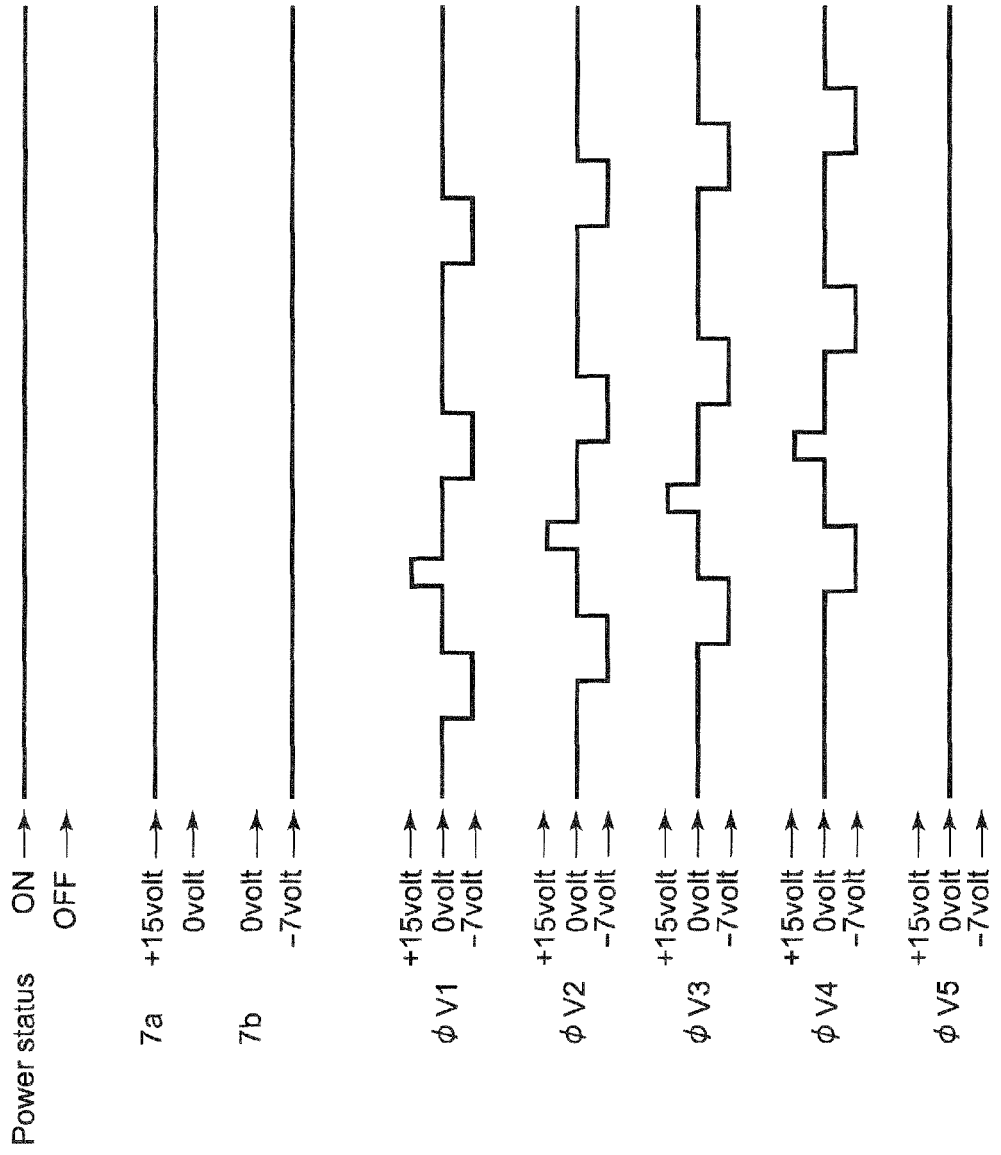
FIG. 4 is a timing chart illustrating changes in voltage level at various parts of the imaging apparatus which is operating in a recording mode.

FIG. 4 is a timing chart illustrating changes in voltage level at various parts of the imaging apparatus which is operating in the recording mode, wherein TG 2 is kept in the active mode. While the imaging apparatus is operating in the recording mode, the power supply circuit 7 is kept in power-on state, and voltage levels at the output terminal 7a of the power supply circuit 7 for a voltage of +15 V and at the output terminal 7b of the power supply circuit 7 for a voltage of −7 V are kept at specified levels, respectively. The output voltages of the vertical drivers 33 to 36 are periodically switched to +15 V, 0 V and −7 V, as shown in FIG. 4. In short, the vertical transfer clock signals $\phi V1$, $\phi V2$, $\phi V3$, and $\phi V4$ are applied to CCD 1. Further, since the output voltage of the vertical driver 37 is kept at a voltage of 0 V, no current flows through the discharging register 10.

Meanwhile, the control unit 8 judges at step S3 whether or not the operation mode has been switched by a user, while the imaging apparatus is in operation. When the operation mode has been switched (YES at step S3), and further when an instruction has been given to switch the operation mode from the recording mode to the reproducing mode (YES at step S4), the control unit 8 switches operation mode of TG 2 from the active mode to the standby mode to cease driving CCD 1 at step S5. After a predetermined period of time has passed (YES at step S6), the control unit 8 makes the power supply circuit 7 cease supplying electric power to the imaging unit, bringing the same unit in power-off state at step S7. The above period of time is set to an extremely short time.

In other words, when driving operation of CCD 1 is ceased, output voltages of the vertical drivers 33 to 36 in the horizontal and vertical driver 3 are temporarily set to a voltage of 0 V and also an output voltage of the vertical driver 37 is set to a voltage of −7 V, and then electric power supply to the imaging unit is stopped.

Figure 5:
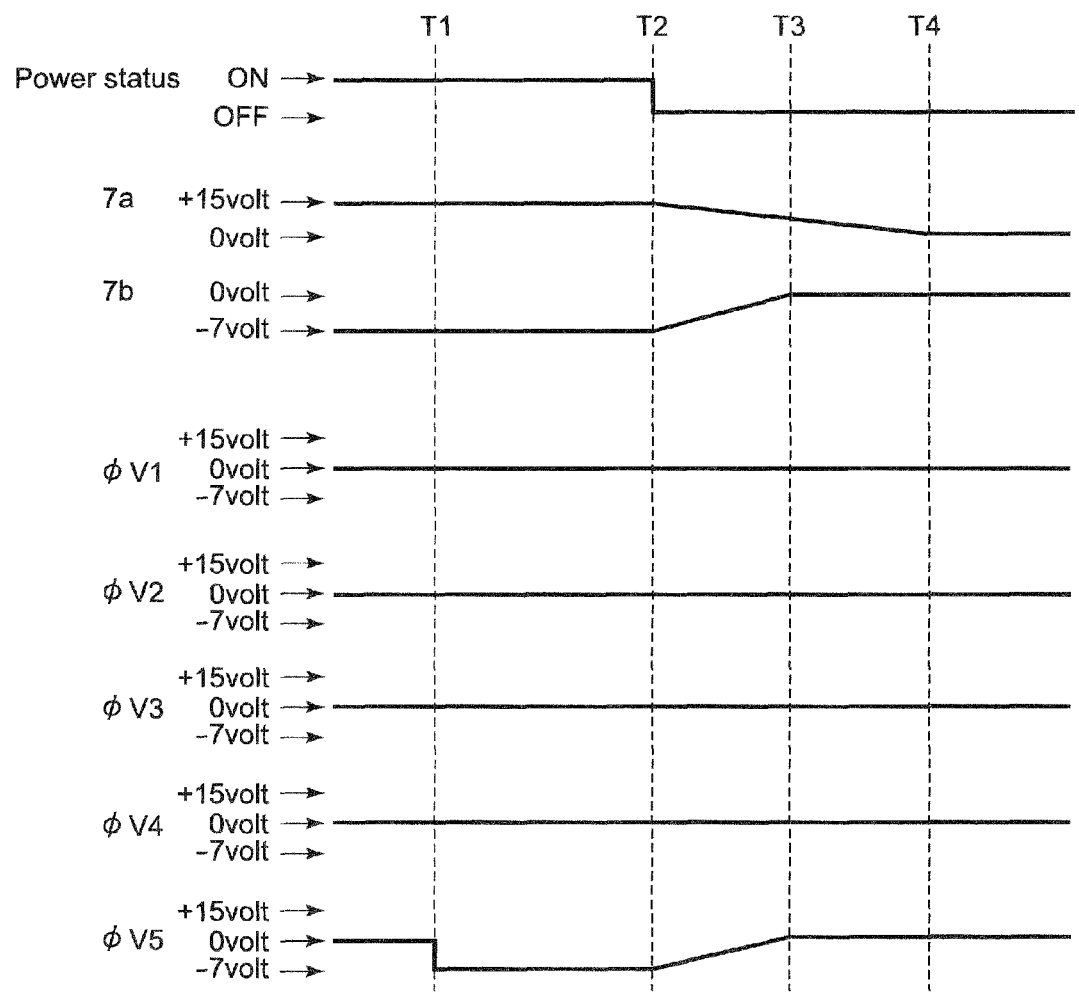
FIG. 5 is a timing chart illustrating changes in voltage level appearing at various parts of the imaging apparatus, when a power source is turned off in the recording mode.

FIG. 5 is a timing chart illustrating changes in voltage level appearing at various parts of the imaging apparatus, when the imaging apparatus is switched from the recording mode to the reproducing mode. As shown in FIG. 5, at the time (T1) when TG 2 is switched from the active mode to the standby mode at step S5 in FIG. 3, the output voltage of the vertical driver 37 changes from 0 V to −7 V. Meanwhile, the output voltages of the vertical drivers 33 to 36 are kept at a voltage of 0 V.

When the power supply to the imaging unit is stopped in this state (at a time T2), the voltage levels at the output terminals 7a and 7b of the power supply circuit 7 for +15 V and −7 V go down toward a voltage of 0V at such time (T2), as shown in FIG. 5. Since the output terminal V5 of the vertical driver 37 is grounded via the register 10, unnecessary charge accumulated in the power supply circuit 7 is discharged from the power input terminal VL for a voltage of −7 V to the ground through the resistor 10.

Accordingly, the voltage level at the output terminal 7b of the power supply circuit 7 for a voltage of −7 V (output terminal V5 of the vertical driver 37) rapidly reaches the ground level (0 V) at a time T3 before the voltage level at the output terminal 7a of the power supply circuit 7 for a voltage of +15 V reaches the ground level (0 V) at a time T4, as shown in FIG. 5. As a result, CCD 1 is prevented from being damaged or deteriorating due to termination of power supply.

Meanwhile, after the power supply to the imaging unit is ceased (i.e. after the operation mode is switched to the reproducing mode), the control unit 8 returns to step S3, where the control unit 8 judges whether or not the user has switched the operation mode. When the operation mode has been switched from the reproducing mode to the recording mode (YES at steps S3, 34 and S8), the control unit 8 returns to step S1, where the control unit 8 brings the imaging unit in power-on state and further the control unit 8 sets TG 2 to the active mode at step S2 to drive CCD 1 again.

When the operation mode has not been switched at step S8 (NO at step S8), and when not instruction has been given to switch the operation mode to the recording mode or to the reproducing mode, the control unit 8 keeps waiting for an operation for switching the operation mode.

Thereafter, the control unit 8 repeatedly performs the above operation. Meanwhile, when the user gives an instruction to turn off the power source of the digital camera, the imaging unit is brought to the power-off state in the same manner as the case where the operation mode is switched from the recording mode to the reproducing mode, and then the whole imaging apparatus is turned off.

In the present embodiment, the vertical driver 37 is packaged together with the horizontal drivers 31, 32 and vertical drivers 33 to 36 within a single module of the horizontal and vertical driver 3. The vertical driver 37 is not used to drive CCD 1 but cooperates with the register 10 in rapidly returning the negative potential in the power supply circuit 7 to the ground level, when the power source is turned off. Meanwhile, the register 10 is provided between the output terminal V5 of the vertical driver 37 and the ground to connect the same terminal 37 to the ground, as described above. According to the present invention, it is only required to secure a space for installing the register 10 on a substrate within the digital camera, and therefore the camera can be made compact in size and CCD 1 is protected from damage and deterioration due to negative potential applied thereto.

In addition, since general products may be used for the horizontal and vertical driver 3 without making any modification and CCD 1 can be protected from damage and deterioration due to negative potential applied thereto at extremely low costs.

Further, when the power source is turned off, the control unit 8 brings the TG 2 into the standby mode at all times, and the output signal (control signal) of TG 2 controls the vertical driver 37 to bring the same driver 37 into a state, where the vertical driver 37 allows unnecessary charge accumulated in the power supply circuit 7 to discharge through the resister 10. Therefore, there is no need to prepare a control line for controlling the vertical driver 37 on the substrate in the camera body, which will be of advantage in making the camera body more compact in size.

The present embodiment of the invention has been described with reference to usage of the vertical driver 37, which is packed in a module together with the vertical drivers 33 to 36, but a switching circuit having a similar function as the vertical driver 37 may be used in place of such driver. In this case, if such switching circuit is connected in parallel with the horizontal drivers 31, 32 and the vertical drivers 33 to 36, a circuit configuration will be made simple and therefore only a small space is needed for installing new electronic parts and circuits. In this case, the camera body can be made small in size and at the same time CCD 1 can be protected from being damaged and deteriorated.

The horizontal and vertical driver 3 may be packed into the same module to be used as a single device.

In the embodiment of the invention, the resister 10 is employed to allow unnecessary charge of the power supply circuit 7 to discharge through the same to the ground when the power source is turned off. But, if the substrate in the camera body has a space to spare, a device other than the register 10 may be used to discharge such unnecessary charge.

The present invention applied to the digital camera has been explained in the above description, but the present invention will be used in imaging apparatuses other than digital cameras. In particular, the present invention shows advantages, when used in apparatuses which require to be made compact and/or in apparatuses such as cellular phones with a camera function, which requires a high-density arrangement of electronic parts.

What is claimed is:

1. An imaging apparatus comprising:
    a power source;
    a power supply circuit connected to the power source and having power supply lines for supplying a positive voltage and a negative voltage;
    an image pickup element;
    plural drivers connected to the power supply circuit through the power supply lines, for generating multi-phase driving signals and applying the generated multi-phase driving signals to the image pickup element;
    a discharging circuit connected to a ground plane; a conducting circuit connected to the power supply line for a negative voltage, wherein the power supply line for a negative voltage is commonly connected to the conducting circuit and the plural drivers; and
    a controller for controlling the conducting circuit to discharge unnecessary charge accumulated in the power source through the power supply line for a negative voltage to the discharging circuit at the time when the power source is turned off; and
    wherein the conducting circuit is a driver which has the same circuit configuration as the plural drivers but is not used to generate a driving signal.

2. The imaging apparatus according to claim 1, wherein the conducting circuit and the plural drivers are packed into a single module.

3. The imaging apparatus according to claim 1, further comprising:

a timing generator for generating timing signals specifying timings for driving the image pickup element and supplying the generated timing signals to the plural drivers; and a timing controller for making the timing generator generate and supply a predetermined control signal to the conducting circuit at the time when the power source is turned off, wherein upon receipt of the control signal, the conducting circuit allows unnecessary charge accumulated in the power supply circuit to flow through the power supply line of the power supply circuit for a negative voltage to the discharging circuit.

* * * * *